United States Patent
Kim et al.

(10) Patent No.: US 12,132,525 B2
(45) Date of Patent: Oct. 29, 2024

(54) POWER MANAGEMENT METHOD AND APPARATUS OF ONU SUPPORTING SLICING FUNCTION

(71) Applicant: ELECTRONICS AND TELECOMMUNICATIONS RESEARCH INSTITUTE, Daejeon (KR)

(72) Inventors: Kwang Ok Kim, Jeonju-si (KR); Kyeong Hwan Doo, Daejeon (KR); Hwan Seok Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 202 days.

(21) Appl. No.: 17/860,219

(22) Filed: Jul. 8, 2022

(65) Prior Publication Data
US 2023/0163861 A1 May 25, 2023

(30) Foreign Application Priority Data
Nov. 23, 2021 (KR) .................. 10-2021-0161898

(51) Int. Cl.
*H04B 10/80* (2013.01)
*H04B 10/27* (2013.01)

(52) U.S. Cl.
CPC ............. *H04B 10/80* (2013.01); *H04B 10/27* (2013.01)

(58) Field of Classification Search
CPC .................... H04B 10/27; H04B 10/80
See application file for complete search history.

(56) References Cited

U.S. PATENT DOCUMENTS

| | | | |
|---|---|---|---|
| 8,346,082 B2 | 1/2013 | Yoon et al. | |
| 9,106,984 B2* | 8/2015 | Mukai | .............. H04L 12/40013 |
| 2011/0211837 A1 | 9/2011 | Sugawa et al. | |
| 2017/0111119 A1 | 4/2017 | Yoo et al. | |

(Continued)

FOREIGN PATENT DOCUMENTS

| | | | |
|---|---|---|---|
| JP | 2009-105890 A | 5/2009 | |
| JP | 2013-251805 A | 12/2013 | |
| JP | 2015-162772 A | 9/2015 | |

(Continued)

*Primary Examiner* — Nathan M Cors
(74) *Attorney, Agent, or Firm* — LRK PATENT LAW FIRM (57) ABSTRACT

Provided are a power management method and apparatus of an ONU supporting a slicing function. A power management method performed by a power management apparatus of an ONU supporting a slicing function includes receiving a first message for discovering a power management attribute of an ONU including at least one slice from an optical line terminal (OLT), transmitting a second message including the power management attribute of the ONU to the OLT in response to the first message received, receiving a third message for setting up a power management parameter for each slice included in the ONU from the OLT, setting up the power management parameter for each slice included in the ONU based on the third message received, and transmitting a fourth message including a set up result of the power management parameter for each slice included in the ONU to the OLT.

16 Claims, 6 Drawing Sheets

(56) References Cited

U.S. PATENT DOCUMENTS

2018/0048477 A1     2/2018   Khotimsky et al.
2024/0063919 A1*   2/2024   Wey ....................... H04B 10/40

FOREIGN PATENT DOCUMENTS

| JP | 6804695 B1 | 12/2020 | | |
|---|---|---|---|---|
| KR | 10-2012-0042896 A | 5/2012 | | |
| KR | 10-2020-0121532 A | 10/2020 | | |
| WO | WO-2012022656 A1 * | 2/2012 | ....... | H04B 10/07955 |
| WO | WO-2016070846 A1 * | 5/2016 | ............. | H04B 10/27 |

* cited by examiner

POWER MANAGEMENT METHOD AND APPARATUS OF ONU SUPPORTING SLICING FUNCTION

CROSS-REFERENCE TO RELATED APPLICATION

This application claims the benefit of Korean Patent Application No. 10-2021-0161898 filed on Nov. 23, 2021, in the Korean Intellectual Property Office, the entire disclosure of which is incorporated herein by reference for all purposes.

BACKGROUND

1. Field of the Invention

One or more example embodiments relate to a power management method and apparatus of an optical network unit (ONU) supporting a slicing function, and more particularly, to a method and apparatus for setting and operating a power management mode for each slice for an ONU in a passive optical network (PON) for providing a slicing function.

2. Description of Related Art

PON is a technology that provides a broadband service to subscribers in an access network. In the PON, one optical line terminal (OLT) and multiple ONUs may be connected through a passive element of a point-to-multipoint structure, the OLT may be installed in a Central office, and the ONU or optical network terminals (ONTs) may be installed in a subscriber's premises. Here, in order to save power of the ONUs, the PON may use a power management protocol to save power consumption of the ONUs.

More specifically, the PON provides three power management modes for the ONU. First, a cyclic sleep mode is a method of on/off controlling power of a receiver and a transmitter in the ONU using sleep time and aware time set up in the OLT. Therefore, the ONU becomes an power-saving state by turning off the power of both the transmitter and the receiver in a sleep section, and become a normal state by turning on the power of both the transmitter and the receiver in an aware section.

Next, a doze mode is a method of on/off controlling the power of the transmitter in the ONU using the sleep time and aware time set up in the OLT. Here, the receiver of the ONU may always maintain an on state. Therefore, the ONU turns off the power of the transmitter in the sleep section to be in an power-saving state, and turns on the power of the transmitter in the aware section to become a normal state.

Lastly, a watchful sleep mode is a method of on/off controlling the power of the transmitter and the receiver using the sleep time and aware time set up in the OLT. Here, the watchful sleep mode may on/off control the power of the transmitter according to the state of the ONU in the watchful section. Therefore, the ONU operates in a normal state by turning on both the power of the transmitter and the receiver in the aware section, and operates in an power-saving state by on/off controlling the power of the transmitter according to the state of the ONU in the watchful section.

Currently, only one of the three power management modes may be selected and used in PON, and to this end, the OLT uses an ONU management control interface (OMCI) message to discover the power saving modes supported by the ONU.

Recently, the application of slicing technology in PON is being considered, and requirements to provide differentiated services for each slice by configuring various slices in ONU are emerging. Accordingly, there is a need for a method for setting up and managing a power management mode for each slice in an ONU supporting a slice function.

SUMMARY

Example embodiments provide a method and apparatus for setting up and operating a power management mode for each slice for an ONU in a PON for providing a slicing function.

According to an aspect, there is provided a power management method performed by a power management apparatus of an ONU supporting a slicing function, the power management method including receiving a first message for discovering a power management attribute of an ONU including at least one slice from an OLT, transmitting a second message including the power management attribute of the ONU to the OLT in response to the first message received, receiving a third message for setting up a power management parameter for each slice included in the ONU from the OLT, setting up the power management parameter for each slice included in the ONU based on the third message received, and transmitting a fourth message including a set up result of the power management parameter for each slice included in the ONU to the OLT, wherein the power management apparatus identifies an identifier included in the third message through a slice parser to set up the power management parameter for each corresponding slice.

The second message may include at least one information of whether or not a slicing function is supported, the number of slices, and whether or not a power management mode is supported for the ONU.

The third message may include at least one information of a power management mode, a slice identifier, sleep time, and aware time for the slice of the ONU.

The ONU may include one PON transmitter and one PON receiver, and may be configured by dividing additional transceiver entities for each slice for each of the PON transmitter and the PON receiver.

According to another aspect, there is provided a power management method performed by a power management apparatus of an ONU supporting a slicing function, the power management method including receiving a fifth message for setting up a power management mode for each slice of an ONU including at least one slice from an OLT, setting up the power management mode for each slice of the ONU based on the received fifth message, and transmitting a sixth message including a set up result of the power management mode for each slice included in the ONU to the OLT, wherein the power management apparatus identifies an identifier included in the fifth message through a slice parser to set up the power management mode for each corresponding slice.

The fifth message may include at least one information of a set up command of the power management mode and a slice identifier for the slice of the ONU.

The sixth message may include at least one information of a power management state and a slice identifier for the slice of the ONU.

When the slice included in the ONU is controlled to be a normal mode state based on the fifth message, the power management apparatus may be configured to maintain optical transmitter corresponding to the slice in an awake state.

When the slice included in the ONU is controlled to be an power saving mode state based on the fifth message, the power management apparatus may be configured to transition optical transmitter corresponding to the slice to a sleep state and an awake state according to preset sleep time and aware time.

According to another aspect, there is provided a power management method performed by a power management apparatus of an OLT supporting a slicing function, the power management method including broadcasting a first message for discovering a power management attribute of ONUs including at least one slice, receiving a second message including the power management attribute from each of the ONUs, transmitting a third message for setting up the power management parameter for each slice included in each of the ONUs, receiving a fourth message including a set up result of the power management parameter for each slice included in each of the ONUs, transmitting a fifth message for setting up a power management mode for each slice included in each of the ONUs, and receiving a sixth message including a set up result of the power management mode for each slice included in each of the ONUs.

The second message may include at least one information of whether or not a slicing function is supported, the number of slices, and whether or not the power management mode is supported for the ONU.

The third message may include at least one information of the power management mode, a slice identifier, sleep time, and aware time for the slice of the ONU.

The fifth message may include at least one information of a set up command of the power management mode and a slice identifier for the slice of the ONU.

The sixth message may include at least one information of a power management state and a slice identifier for the slice of the ONU.

When the slice included in the ONU is controlled to be a normal mode state based on the fifth message, a power management apparatus included in the ONU may be configured to maintain optical transmitter corresponding to the slice in an awake state.

When the slice included in the ONU is controlled to be an power saving mode state based on the fifth message, a power management apparatus included in the ONU may be configured to transition optical transmitter corresponding to the slice to a sleep state and an awake state according to preset sleep time and aware time.

Additional aspects of example embodiments will be set forth in part in the description which follows and, in part, will be apparent from the description, or may be learned by practice of the disclosure.

According to example embodiments, it is possible to provide a method and apparatus for setting up and operating a power management mode for each slice for an ONU through discovery and setting protocols and control messages of newly defined ONU power management attributes in a PON providing for a slicing function.

In addition, according to example embodiments, it is possible to provide a power management function while maintaining mutual compatibility even for ONUs that do not support the slicing function, thereby increasing power saving efficiency when one ONU is divided into virtual slices to be used.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

Figure 1:
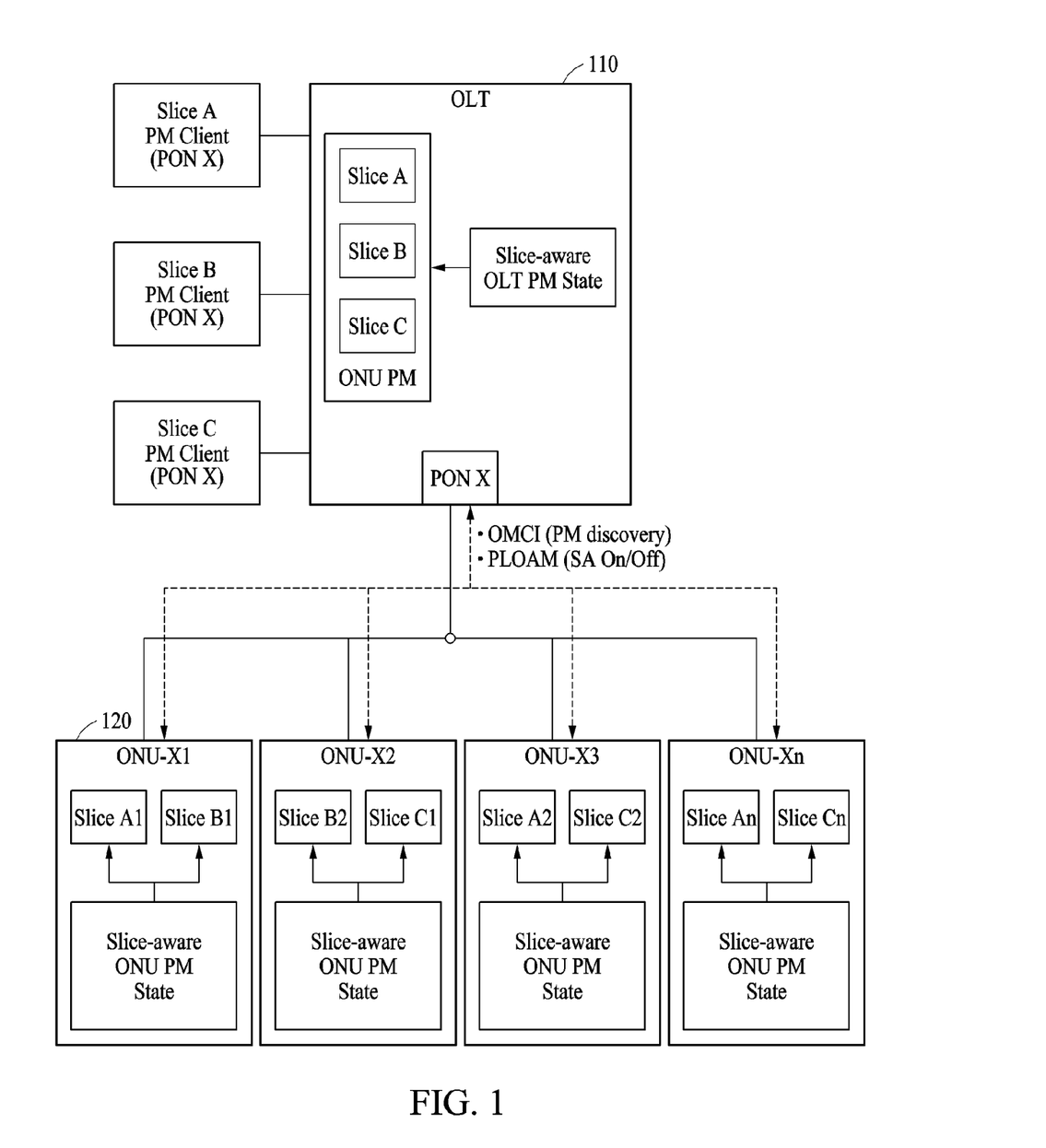
FIG. 1 is a diagram illustrating a configuration diagram of a PON supporting a slicing function according to an example embodiment.

FIG. 1 is a diagram illustrating a configuration diagram of a PON supporting a slicing function according to an example embodiment.

Referring to FIG. 1, in a PON 100, one OLT 110 and a plurality of ONUs 120 may be connected in a point-to-multipoint structure. One physical PON 100 may configure virtualized slices and may provide an independent data service for each slice. Here, the OLT 110 may provide a power management function for the N ONUs 120, and each of the ONUs 120 may perform a power management function for each slice configured in the ONU 120 under the control of the OLT 110. To this end, each of the OLT 110 and ONUs 120 may include a power management apparatus 111 and a power management apparatus 121, wherein a slice-aware OLT PM state and a slice-aware ONU PM state of FIG. 1 may correspond to the power management apparatus 111 and the power management apparatus 121, respectively.

The power management apparatus 121 and a power management method performed by the power management apparatus 111 will be described in detail with reference to the following drawings.

Figure 2:
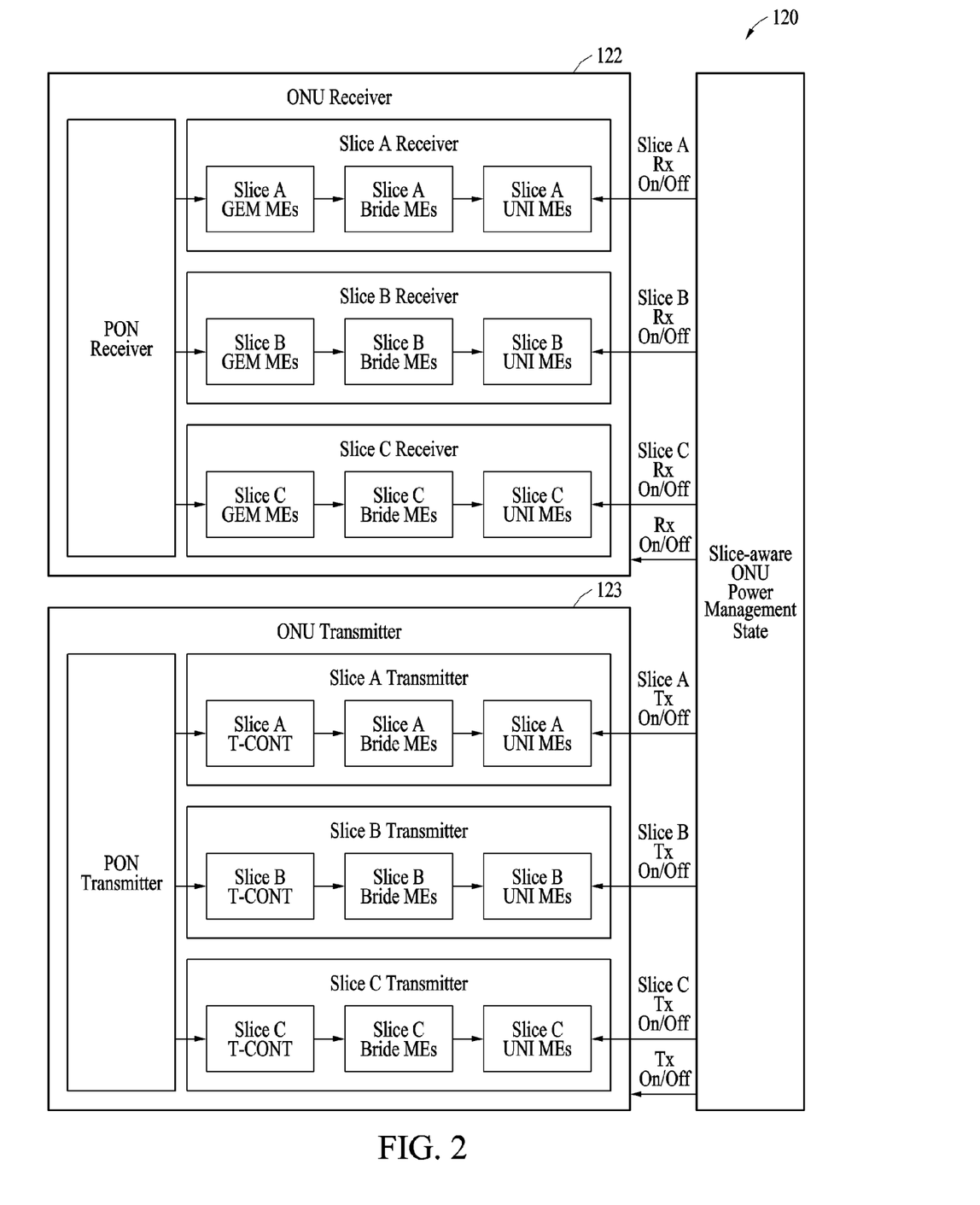
FIG. 2 is a diagram illustrating a structure of an ONU supporting a slicing function according to an example embodiment.

FIG. 2 is a diagram illustrating a structure of an ONU supporting a slicing function according to an example embodiment.

Referring to FIG. 2, the ONU 120 supporting the slicing function may configure data service entities of a receiver 122 and a transmitter 123 for each slice. More specifically, the ONU 120 supporting the slicing function may include one PON receiver and one PON transmitter in the receiver 122 and the transmitter 123, respectively. Here, the receiver 122 and the transmitter 123 of the ONU 120 may further include additional transceiving entities for each slice for the PON receiver and the PON transmitter, respectively.

As an example, the transceiving entities added for each slice may include a GPON encapsulation method (GEM) transceiving entity, a bridge transceiving entity, and a user network interface (UNI) transceiving entity. The GEM transceiving entity mainly performs functions such as GEM frame identification and delivery and service class control in the PON 100, the bridge transceiving entity performs functions such as switching of the GEM transceiving entity and the UNI transceiving entity, VLAN filtering and etc., and the UNI transceiving entity mainly performs functions such as packet transceiving control at the subscriber port. These transceiving entities may be consisted of various entities according to a data service model for each slice using an OMCI message transmitted from the OLT 110.

Meanwhile, the ONU 120 supporting the slicing function may include the power management apparatus 121 for power management control of the receiver 122 and the transmitter 123 for each slice. Here, a slice-aware ONU power management state in FIG. 2 may correspond to the power management apparatus 121.

In other words, the power management apparatus 121 of the ONU 120 supporting the slicing function provided in the example embodiments may more efficiently save power by turning on/off the power of the apparatuses included in the receiver 122 and the transmitter 123 for each slice according to sleep time and aware time set up by the OLT 110.

Here, the ONU 120 supporting the slicing function according to the example embodiments may or may not use a power management function for each slice, and is characterized in that the power management control is performed for each slice using one power management apparatus 121.

Figure 3:
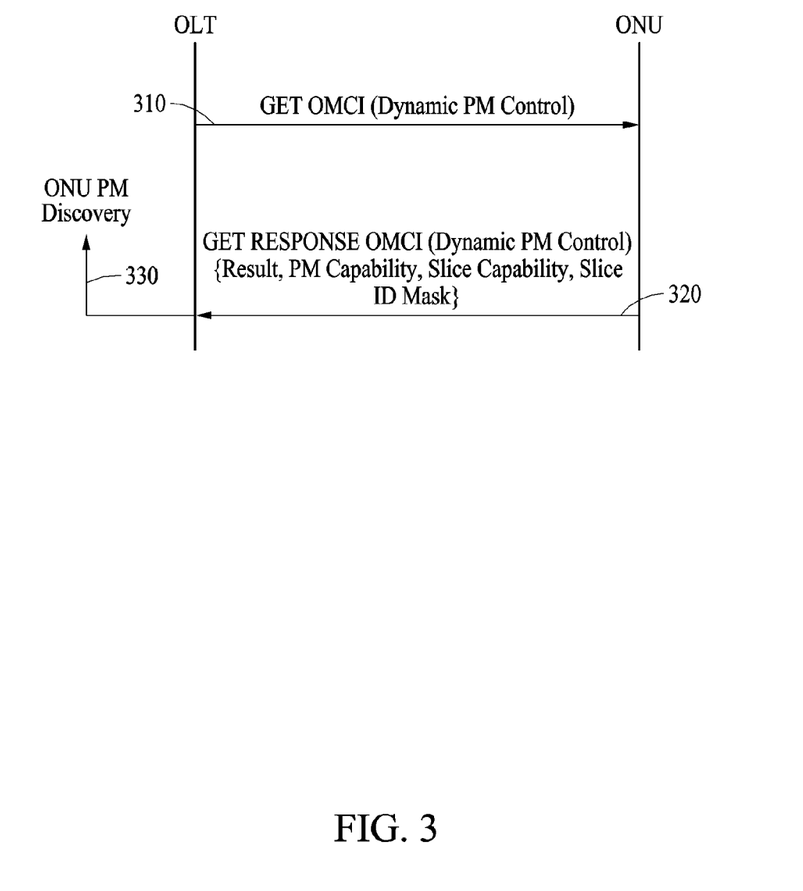
FIG. 3 is a diagram illustrating a process of discovering power management attributes in an ONU supporting a slicing function according to an example embodiment.

FIG. 3 is a diagram illustrating a process of discovering power management attributes in an ONU supporting a slicing function according to an example embodiment.

Referring to FIG. 3, discovery of the power management attributes in the ONU 120 supporting the slicing function may be performed using an OMCI message. More specifically, in operation 310, the OLT 110 may broadcast a first message for discovering the power management attributes of the ONU 120 including at least one slice.

As an example, the first message broadcast to the ONU 120 may be a "Dynamic PM Control" GET OMCI message. The GET OMCI message may have a structure as shown in Table 1 below.

TABLE 1

| Byte Number | Size | Field |
| --- | --- | --- |
| 1-2 | 2 | Transaction Correlation Identifier |
| 3 | 1 | Message Type (GET) |
| 4 | 1 | Device Identifier (Baseline) |
| 5-8 | 4 | Managed Entity Identifier-Class: ONU Dynamic PM Control |
| 9-10 | 2 | Attribute Mask |
| 11-40 | 30 | Zero Padding |
| 41-48 | 8 | OMCI Trailer |

More specifically, the message type of the GET OMCI message may indicate the GET attribute, and the class may have a value of "ONU Dynamic PM Control". In addition, it is possible to set up a bit corresponding to the parameter value to be responded to in the attribute mask.

In operation 320, when the GET OMCI message is normally received, the ONU 120 may transmit a second message including the power management attributes of the corresponding ONU to the OLT 110. As an example, the second message transmitted to the OLT 110 may be a "Dynamic PM Control" GET RESPONSE OMCI message. The GET RESPONSE OMCI message may have a structure as shown in Table 2 below.

TABLE 2

| Byte Number | Size | Field |
| --- | --- | --- |
| 1-2 | 2 | Transaction Correlation Identifier |
| 3 | 1 | Message Type (GET RESPONSE) |
| 4 | 1 | Device Identifier (Baseline) |
| 5-8 | 4 | Managed Entity Identifier-Class: ONU Dynamic PM Control |
| 9 | 1 | Result |
| 10-11 | 2 | Attribute Mask |
| 12 | 1 | Power Reduction Management Capability |
| 13 | 1 | Slice Capability (0: Not Support, 1: Support) |
| 14-15 | 2 | Slice ID Mask (Bit Map) |
| 16-40 | 26 | Zero Padding |
| 41-48 | 8 | OMCI Trailer |

The GET RESPONSE OMCI message may include power management capability (PM Capability), slice capability, and slice ID mask information of the ONU 120. Through this process, in operation 330, the OLT 110 may discover at least one power management attribute of whether or not a slicing function is supported, the number of slices, and whether or not a power management mode is supported for the ONU 120.

More specifically, the message type of the GET RESPONSE OMCI message indicates the GET RESPONSE attribute, and the class may have a value of "ONU Dynamic PM Control". In addition, the power management mode supported by the ONU 120 may be transmitted through the "Power Reduction Management Capability" field. This field may indicate which power management mode the ONU 120 supporting the slicing function may support or may not support.

In addition, the GET RESPONSE OMCI message according to the example embodiments may respond whether the ONU 120 supports the slicing function through the "Slice Capability" field. For example, if the value of the "Slice Capability" field is '1', it may mean that the ONU 120 supports the slicing function, and if it is '0', it may mean that the ONU 120 does not support the slicing function.

In addition, the GET RESPONSE OMCI message according to the example embodiments may indicate the number of slices supported by the ONU 120 using the "Slice ID Mask" field. As shown in Table 2, 2 bytes may represent to support a maximum of 16 slices. The "Slice ID Mask" field may be extended to support more slices.

Figure 4:
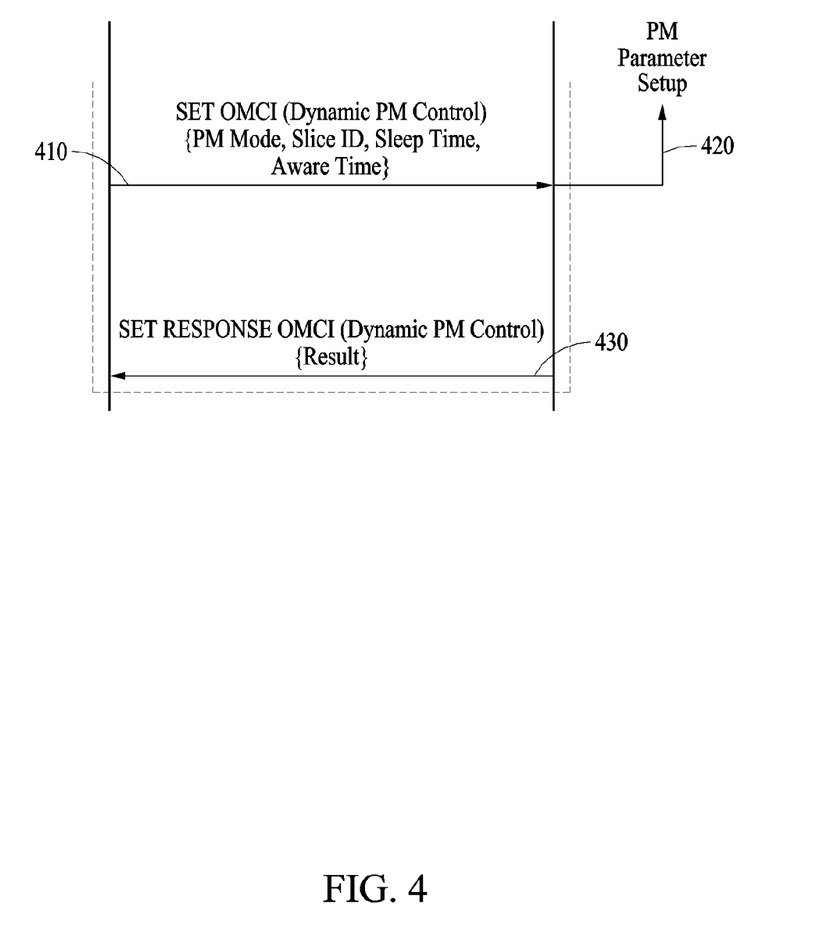
FIG. 4 is a diagram illustrating a process of setting up power management parameters in an ONU supporting a slicing function according to an example embodiment.

FIG. 4 is a diagram illustrating a process of setting up power management parameters in an ONU supporting a slicing function according to an example embodiment.

After the OLT 110 discovers the power management attributes of the ONU 102 supporting the slicing function, the power management parameters may be set up in the ONU 120. Referring to FIG. 4, setting up of the power management parameters in the ONU 120 may also be performed using an OMCI message.

More specifically, in operation 410, the OLT 120 may transmit a third message for setting up the power management parameters of the ONU 120 including at least one slice to the ONU 120. For example, the third message transmitted to the ONU 120 may be a "Dynamic PM Control" SET OMCI message. The SET OMCI message may have a structure as shown in Table 3 below.

TABLE 3

| Byte Number | Size | Field |
|---|---|---|
| 1-2 | 2 | Transaction Correlation Identifier |
| 3 | 1 | Message Type (SET) |
| 4 | 1 | Device Identifier (Baseline) |
| 5-8 | 4 | Managed Entity Identifier-Class: ONU Dynamic PM Control |
| 9-10 | 2 | Attribute Mask |
| 11 | 1 | Power Reduction Management Mode |
| 12 | 1 | Slice ID (0: Legacy, 1: Slice A, 2: Slice B, 3: Slice C, . . .) |
| 13-16 | 4 | Maximum Sleep Time |
| 17-20 | 4 | Maximum Aware Time |
| 21-40 | 20 | Others Attribute Values |
| 41-48 | 8 | OMCI Trailer |

More specifically, the message type of the SET OMCI message may indicate the SET attribute, and the class may have a value of "ONU Dynamic PM Control". The SET OMCI message according to the example embodiments may include a power management mode (PM Mode), a slice identifier (Slice ID), a maximum sleep time, and a maximum awareness time.

The OLT 110 may set power management parameters for one slice using one SET OMCI message. Further, additional fields may be used to set power management parameters for multiple slices through one SET OMCI message.

In operation 420, when the "Dynamic PM Control" SET OMCI message is normally received, the ONU 120 may set up power management parameters of the corresponding ONU for each slice. As mentioned above, the SET OMCI message according to the example embodiments may deliver a PM Mode, a Slice ID, a maximum sleep time, and a maximum aware time. Through this process, the OLT 110 may set the sleep time and the aware time for each slice of the ONU 120.

In operation 430, when the power management parameters are set through the normally delivered "Dynamic PM Control" SET OMCI message, the ONU 120 may transmit a fourth message including the setting result of the power management parameters for each slice to the OLT 110. As an example, the fourth message transmitted to the OLT 110 may be a "Dynamic PM Control" SET RESPONSE OMCI message. The SET RESPONSE OMCI message may have a structure as shown in Table 4 below.

TABLE 4

| Byte Number | Size | Field |
|---|---|---|
| 1-2 | 2 | Transaction Correlation Identifier |
| 3 | 1 | Message Type (SET RESPONSE) |
| 4 | 1 | Device Identifier (Baseline) |
| 5-8 | 4 | Managed Entity Identifier-Class: ONU Dynamic PM Control |
| 9 | 1 | Result |
| 10-11 | 2 | Optional Attribute Mask |
| 12-13 | 2 | Attribute Execution Mask |
| 14-40 | 27 | Zero Padding |
| 41-48 | 8 | OMCI Trailer |

More specifically, the message type of the SET RESPONSE OMCI message may indicate the SET RESPONSE attribute, and the class may have a value of "ONU Dynamic PM Control". In addition, whether the setting up of the power management parameters requested by the OLT 110 is successful may be transmitted using the Result field. When the Result field is successfully received, the OLT 110 may operate power management for each slice of the ONU 120 supporting the slicing function.

Figure 5:
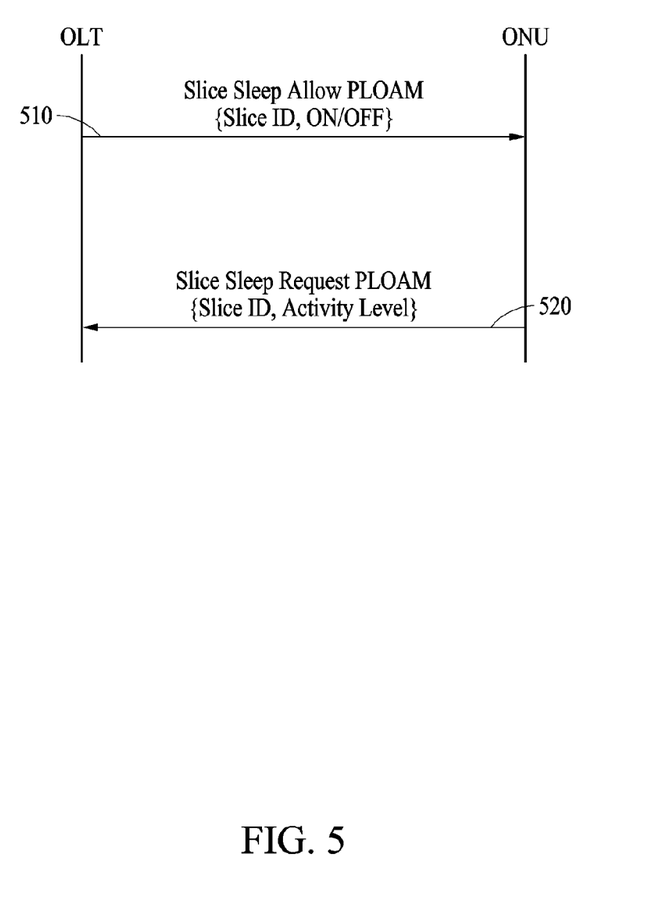
FIG. 5 is a diagram illustrating a procedure for power management control of an ONU supporting a slicing function according to an example embodiment.

FIG. 5 is a diagram illustrating a procedure for power management control of an ONU supporting a slicing function according to an example embodiment.

Referring to FIG. 5, the OLT 110 may perform power management control for each slice for the ONU 120 supporting the slicing function using a PLOAM message. More specifically, in operation 510, the OLT 110 may transmit a fifth message for power management control of the ONU 120 including at least one slice to the ONU 120. As an example, the fifth message transmitted to the ONU 120 may be a Slice Sleep Allow PLOAM message. The Slice Sleep Allow PLOAM message may have a structure as shown in Table 5 below.

TABLE 5

| Octet | Content | Description |
|---|---|---|
| 1-2 | ONU-ID | Transaction Correlation Identifier |
| 3 | Message Type ID | 0x 12 (Sleep Allow) |
| 4 | Sequence Number | Unicast or Broadcast Sequence Number |
| 5 | Control Flag | 0: Sleep Allowed OFF 1: Sleep Allowed ON |
| 6 | Slice ID | 0: All, 1: Slice A, 2: Slice B, 3: Slice C, . . . |
| 7-40 | Padding | 0x 00 |
| 41-48 | MIC | |

More specifically, the Slice Sleep Allow PLOAM message includes a slice identifier, and the power management apparatus 121 of the corresponding ONU 120 may be operated by using the slice identifier. In other words, Sleep Allowed OFF may instruct the ONU 120 to change from the power saving mode to the normal mode, and Sleep Allowed ON may instruct the ONU 120 to change from the normal mode to the power saving mode. Accordingly, the ONU 120 may be controlled to be the normal mode and the power saving mode state according to the control flag value in the Slice Sleep PLOAM message for each slice.

In operation 520, when power management control is performed through the Slice Sleep Allow PLOAM message, the ONU 120 may transmit a sixth message including the state of the power management mode for each slice to the OLT 110. As an example, the sixth message transmitted to the OLT 110 may be a Slice Request PLOAM message. The Slice Request PLOAM message may have a structure as shown in Table 6 below.

TABLE 6

| Octet | Content | Description |
|---|---|---|
| 1-2 | ONU-ID | Transaction Correlation Identifier |
| 3 | Message Type ID | 0x 10 (Sleep Request) |
| 4 | Sequence Number | 0x 00 |
| 5 | Activity Level | 0x 00: Awake 0x 03: Sleep |
| 6 | Slice ID | 0: Legacy, 1: Slice A, 2: Slice B, 3: Slice C, . . . |
| 7-40 | Padding | 0x 00 |
| 41-48 | MIC | |

More specifically, the Slice Sleep Request PLOAM message includes a slice identifier, and the state of the power management mode for each slice of the corresponding ONU 120 may be transmitted to the OLT 110 by using the slice identifier. When the field of the Activate Level is 0, the awake state is indicated, which may indicate that the ONU 120 wakes up from the power saving mode to the normal mode. On the other hand, when the field of the Activate Level is 3, the sleep state is indicated, which may indicate that the ONU 120 is changed from the normal mode to the power saving mode. The example embodiments may maintain the power management synchronization for each slice between the OLT 110 and the ONU 120 using such a PLOAM message.

Figure 6:
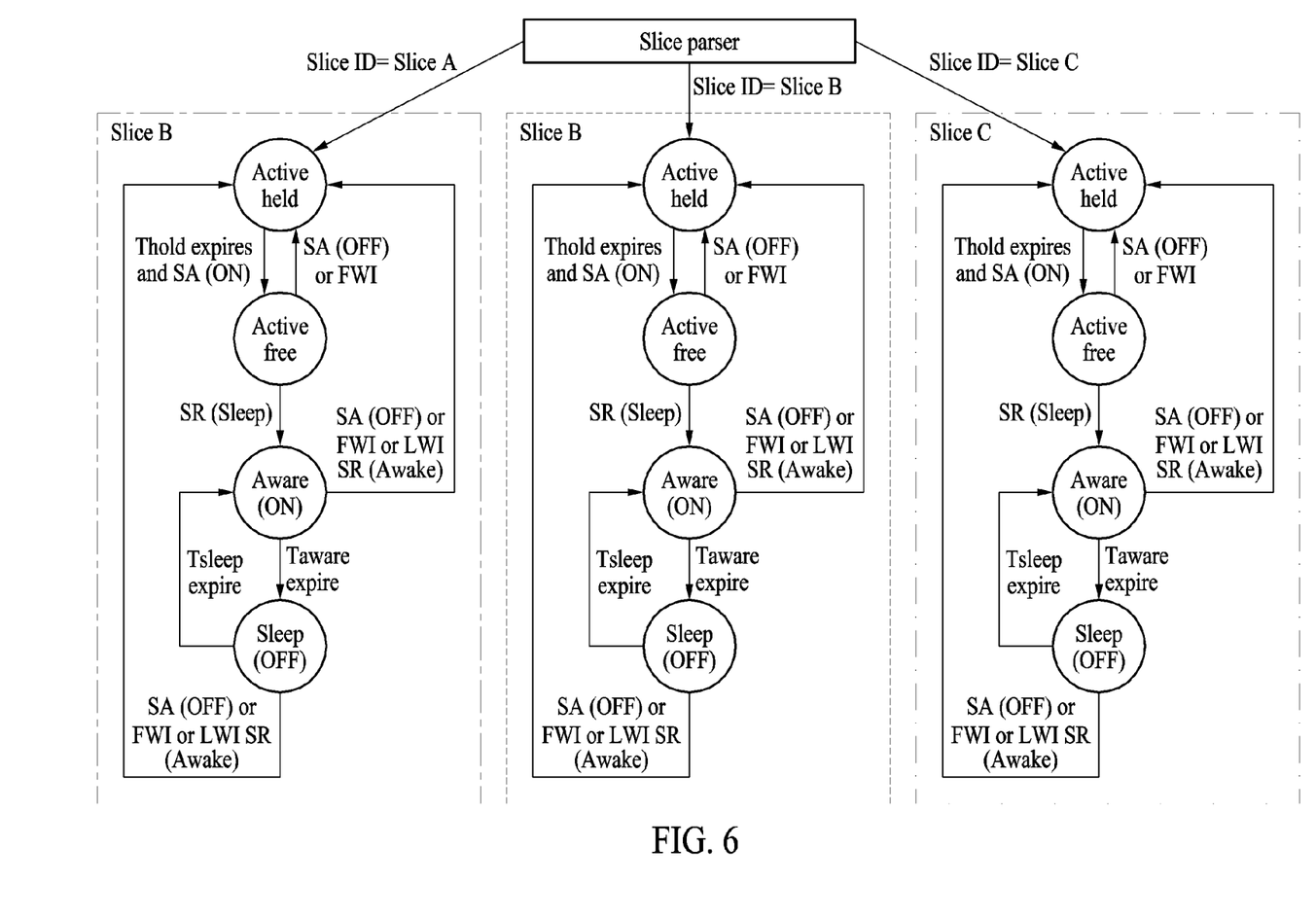
FIG. 6 is a diagram illustrating a configuration of a power management apparatus included in an ONU supporting a slicing function according to an example embodiment.

FIG. 6 is a diagram illustrating a configuration of a power management apparatus included in an ONU supporting a slicing function according to an example embodiment.

Referring to FIG. 6, the power management apparatus 121 of the ONU 120 supporting the slicing function is configured for each slice, and power management parameters delivered from the OLT 110 through a slice parser may be set up for each slice. Here, the ONU 120 may maintain the state of the power management mode for each slice, and may perform power management control of the receiver 122 and the transmitter 123 for each slice.

The ONU 120 may initially be in an active held state, whereby each of the slices of the ONU 120 operates in a normal mode. When an SA(ON) value is delivered in the Slice Sleep Allow PLOAM message, the ONU 120 may transition the corresponding slice to Active Free.

Thereafter, the ONU 120 may respond to the OLT 110 with the state of the power management mode for each slice with a Slice Sleep Request PLOAM message including an SR (Sleep). When the SR (Sleep) state is received through the Slice Sleep Request PLOAM message, the OLT 110 knows that the ONU 120 enters the power saving mode.

The ONU 120 repeatedly transitions between the sleep state and the awake state by using the sleep time and the aware time for each slice received from the OLT 110, and the power saving mode may be performed in the sleep state.

Thereafter, when the Slice Sleep Allow PLOAM message including SA(OFF) is received from the OLT 110, the ONU 120 may transition to the active held state and stop the operation of the power saving mode. In addition, the ONU 120 may respond to the OLT 110 with the state of the power management mode for each slice with a Slice Sleep Request PLOAM message including an SR (Awake). When the SR(Awake) state is received through the Slice Sleep Request PLOAM message, the OLT 110 knows that the ONU 120 transitions from the power saving mode to the normal mode.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The methods according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A power management method performed by a power management apparatus of an optical network unit (ONU) supporting a slicing function, the power management method comprising:
   receiving a first message for discovering a power management attribute of an ONU including multiple slices from an optical line terminal (OLT);
   transmitting a second message including the power management attribute of the ONU to the OLT in response to the first message received;
   receiving a third message for setting up a power management parameter for each slice included in the ONU from the OLT;
   setting up the power management parameter for each slice included in the ONU based on the third message received; and
   transmitting a fourth message including a set up result of the power management parameter for each slice included in the ONU to the OLT,
   wherein the power management apparatus identifies an identifier included in the third message through a slice parser to set up the power management parameter for each corresponding slice.

2. The power management method of claim 1, wherein the second message includes at least one information of the number of slices, and whether or not a power management mode is supported for the ONU.

3. The power management method of claim 1, wherein the third message includes at least one information of a power management mode, a slice identifier, sleep time, and aware time for the slice of the ONU.

4. The power management method of claim 1, wherein the ONU comprises one passive optical network (PON) transmitter and one PON receiver, and
   is configured by dividing additional transceiver entities for each slice for each of the PON transmitter and the PON receiver.

5. A power management method performed by a power management apparatus of an optical network unit (ONU) supporting a slicing function, the power management method comprising:
   receiving a first message for setting up a power management mode for each slice of an ONU including multiple slices from an optical line terminal (OLT);
   setting up the power management mode for each slice of the ONU based on the received first message; and
   transmitting a second message including a set up result of the power management mode for each slice included in the ONU to the OLT,
   wherein the power management apparatus identifies an identifier included in the first message through a slice parser to set up the power management mode for each corresponding slice.

6. The power management method of claim 5, wherein the first message includes at least one information of a set up command of the power management mode and a slice identifier for the slice of the ONU.

7. The power management method of claim 5, wherein the second message includes at least one information of a power management state and a slice identifier for the slice of the ONU.

8. The power management method of claim 5, wherein, when the slice included in the ONU is controlled to be a normal mode state based on the first message, the power management apparatus is configured to maintain optical transmitter corresponding to the slice in an awake state.

9. The power management method of claim 5, wherein, when the slice included in the ONU is controlled to be a power saving mode state based on the first message, the power management apparatus is configured to transition optical transmitter corresponding to the slice to a sleep state and an awake state according to preset sleep time and aware time.

10. A power management method performed by a power management apparatus of an optical line terminal (OLT) supporting a slicing function, the power management method comprising:
    broadcasting a first message for discovering a power management attribute of optical network units (ONUs) including multiple slices;
    receiving a second message including the power management attribute from each of the ONUs;
    transmitting a third message for setting up a power management parameter for each slice included in each of the ONUs;
    receiving a fourth message including a set up result of the power management parameter for each slice included in each of the ONUs;
    transmitting a fifth message for setting up a power management mode for each slice included in each of the ONUs; and
    receiving a sixth message including a set up result of the power management mode for each slice included in each of the ONUs.

11. The power management method of claim 10, wherein the second message includes at least one information of the number of slices, and whether or not the power management mode is supported for the ONU.

12. The power management method of claim 10, wherein the third message includes at least one information of the power management mode, a slice identifier, sleep time, and aware time for the slice of the ONU.

13. The power management method of claim 10, wherein the fifth message includes at least one information of a set up command of the power management mode and a slice identifier for the slice of the ONU.

14. The power management method of claim 10, wherein the sixth message includes at least one information of a power management state and a slice identifier for the slice of the ONU.

15. The power management method of claim 10, wherein, when the slice included in the ONU is controlled to be a normal mode state based on the fifth message, a power management apparatus included in the ONU is configured to maintain optical transmitter and receiver corresponding to the slice in an awake state.

16. The power management method of claim 10, wherein, when the slice included in the ONU is controlled to be a power saving mode state based on the fifth message, a power management apparatus included in the ONU is configured to transition optical transmitter and receiver corresponding to the slice to a sleep state and an awake state according to preset sleep time and aware time.

\* \* \* \* \*